Aug. 8, 1939.  R. LAPSLEY  2,168,350
TORQUE CONVERTING AND TRANSMITTING MECHANISM
Original Filed July 12, 1933   5 Sheets—Sheet 3

Inventor
Robert Lapsley
By Brown, Jackson, Boettcher & Dienner
Attys.

Aug. 8, 1939.  R. LAPSLEY  2,168,350
TORQUE CONVERTING AND TRANSMITTING MECHANISM
Original Filed July 12, 1933  5 Sheets-Sheet 4

Inventor
Robert Lapsley
By Brown, Jackson, Boettcher & Dienner
Attys.

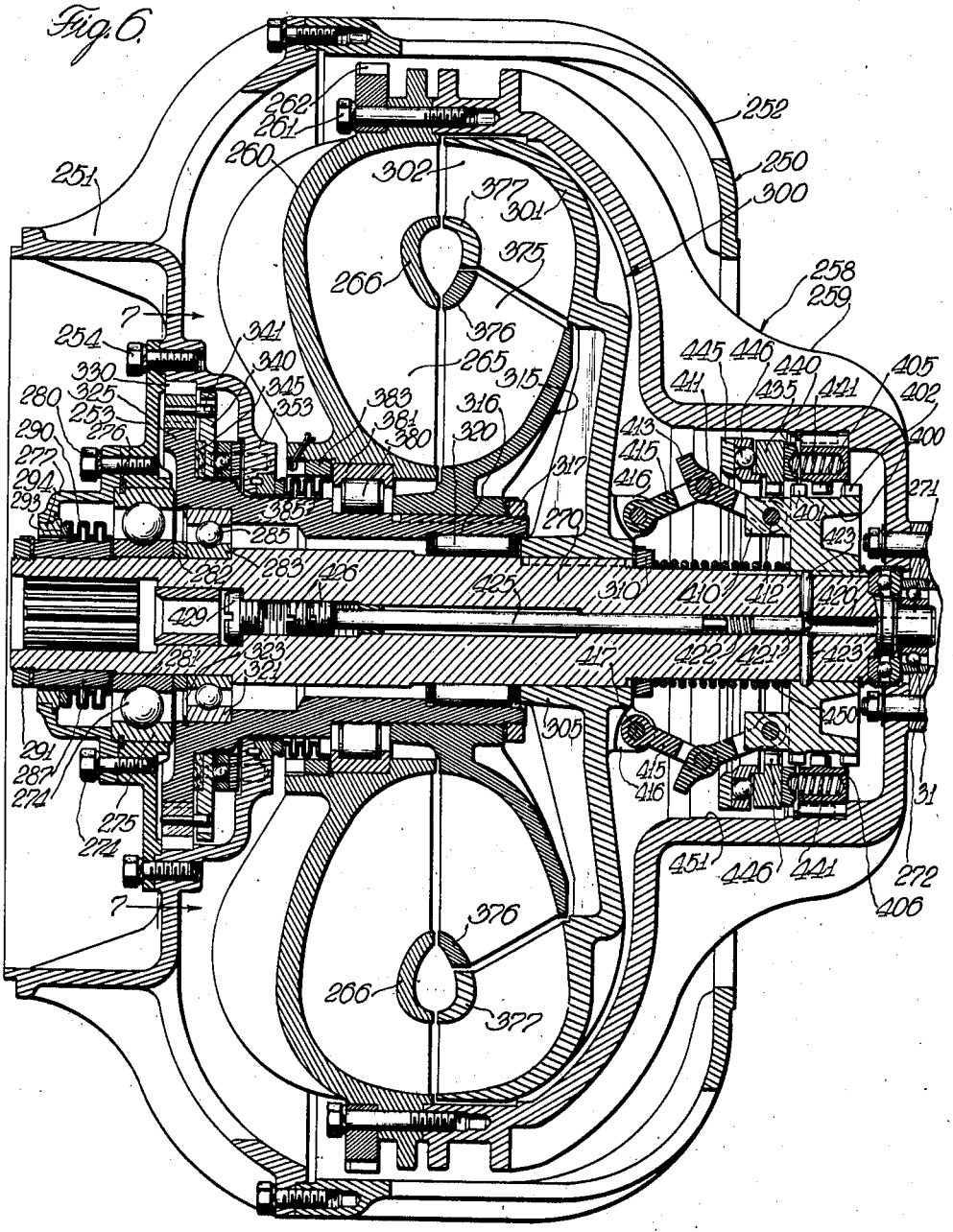

Patented Aug. 8, 1939

2,168,350

UNITED STATES PATENT OFFICE 2,168,350

TORQUE CONVERTING AND TRANSMITTING MECHANISM

Robert Lapsley, Berrien Springs, Mich., assignor to Clark Equipment Company, Buchanan, Mich., a corporation of Michigan Application July 12, 1933, Serial No. 680,115
Renewed July 6, 1936

25 Claims. (Cl. 192—48)

The present invention relates generally to transmissions for automotive vehicles and the like. The principal purpose of the present invention is the provision of a new and improved torque converting and transmitting means in which is embodied means arranged to transmit power at such ratio that sufficient torque is available for starting and acceleration at the lower speeds, and which also includes automatically controlled means for transmitting power at a direct or one-to-one ratio.

More specifically, one object of the present invention is the provision of transmission apparatus embodying a hydraulic device arranged to transmit power at the lower speeds and including a driving and a driven member with additional means adapted to lock the driving and driven members together after a given speed has been attained.

Another object of the present invention is the provision of a hydraulic torque converting means arranged to transmit power by means of a fluid which serves as a transmitting medium, in connection with a speed controlled mechanical clutch actuated by governor mechanism to effect a mechanical connection between the driving and driven parts when the speed of the driven part has attained a predetermined or given value.

An additional object of the present invention is the provision of means adapted to automatically delay the actuation of the governor mechanism until the desired speed has been attained, and a still further object of the present invention is the provision of means to delay the engagement of the clutch parts until the driving and driven members have attained the same speed and rotate in substantial synchronism.

An additional object of the present invention is the provision of new and improved torque converting apparatus which includes a fluid impelling member and a fluid impelled member and means entirely automatic in operation for transmitting the torque at a multiplied ratio at low speeds and which, after a given speed has been attained, becomes automatically effective in increasing the driving ratio so that the driving and driven parts parctically rotate together at a one-to-one ratio. In this connection, the present invention further contemplates the provision of governor controlled clutch means in this type of construction in which, when the driving and driven parts are rotating together or substantially so, the governor controlled means becomes automatically operable to effect a mechanical connection between the driving and driven parts.

Still further, another object of the present invention is the provision of improved synchronizing means, particularly in connection with governor controlled mechanism but not necessarily so, which embodies means made operative to connect the driving and driven parts together automatically as soon as the speed of the driven parts begins to exceed the speed of the driving parts.

An additional object of the present invention is the provision of an improved torque converter and transmitting means which embodies a fluid impeller, a fluid impelled or turbine member, and a stator which is so constructed and arranged as to be rotatable in the direction of rotation of the fluid impeller, but prevented from rotating in the other direction by ratchet means serving as a one-way brake. By virtue of this construction, at the lower speeds the stator serves as a stationary guiding member which is subjected to the residual velocity of the fluid emerging from the fluid impelled member and can be used, therefore, to redirect the power transmitting fluid into the driving impeller in such a manner as to retain the kinetic energy of the fluid. Thus, no power is lost and a maximum torque multiplication is secured. At the same time, by virtue of the stator being rotatable in the one direction as the speed of the fluid impelled member increases to such a point that the residual velocity of the transmitting fluid emerging from the fluid impelled member is less than the peripheral speed of said member, the stator can then rotate with the impeller and the fluid impelled member, securing thereby a substantially direct drive between the driving impeller and the driven or fluid impelled member. According to the present invention, therefore, a hydraulic torque converter and transmitting means is provided which automatically secures two driving ratios and these ratios are established automatically and without any attention on the part of the operator. Further, these ratios are automatically established at the time when such ratios are feasible.

These and other objects and advantages of the present invention will be apparent to those skilled in the art after a consideration of the following detailed description of the preferred construction, taken in connection with the accompanying drawings, illustrating such construction.

Figure 7:
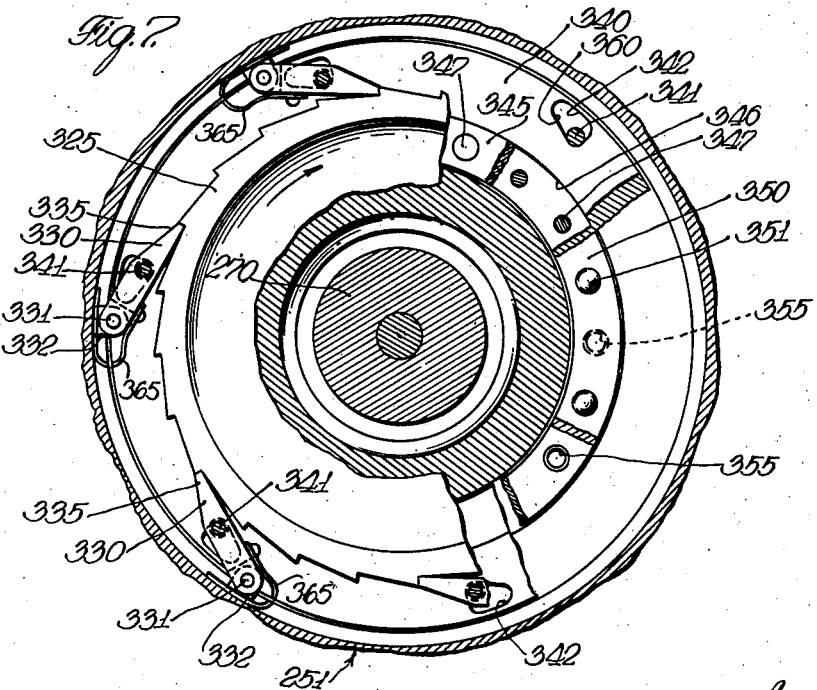

Figure 6 is a vertical longitudinal section taken through a second form of the present invention, in which is embodied an improved torque converter for automatically securing two driving ratios; and Figure 7 is a fragmentary section taken along the line 7—7 of Figure 6 and illustrating the one-way brake means by which the stator of the torque converter shown in Figure 6 is prevented from rotating in one direction and permitted to rotate in the other direction.

Figure 1:
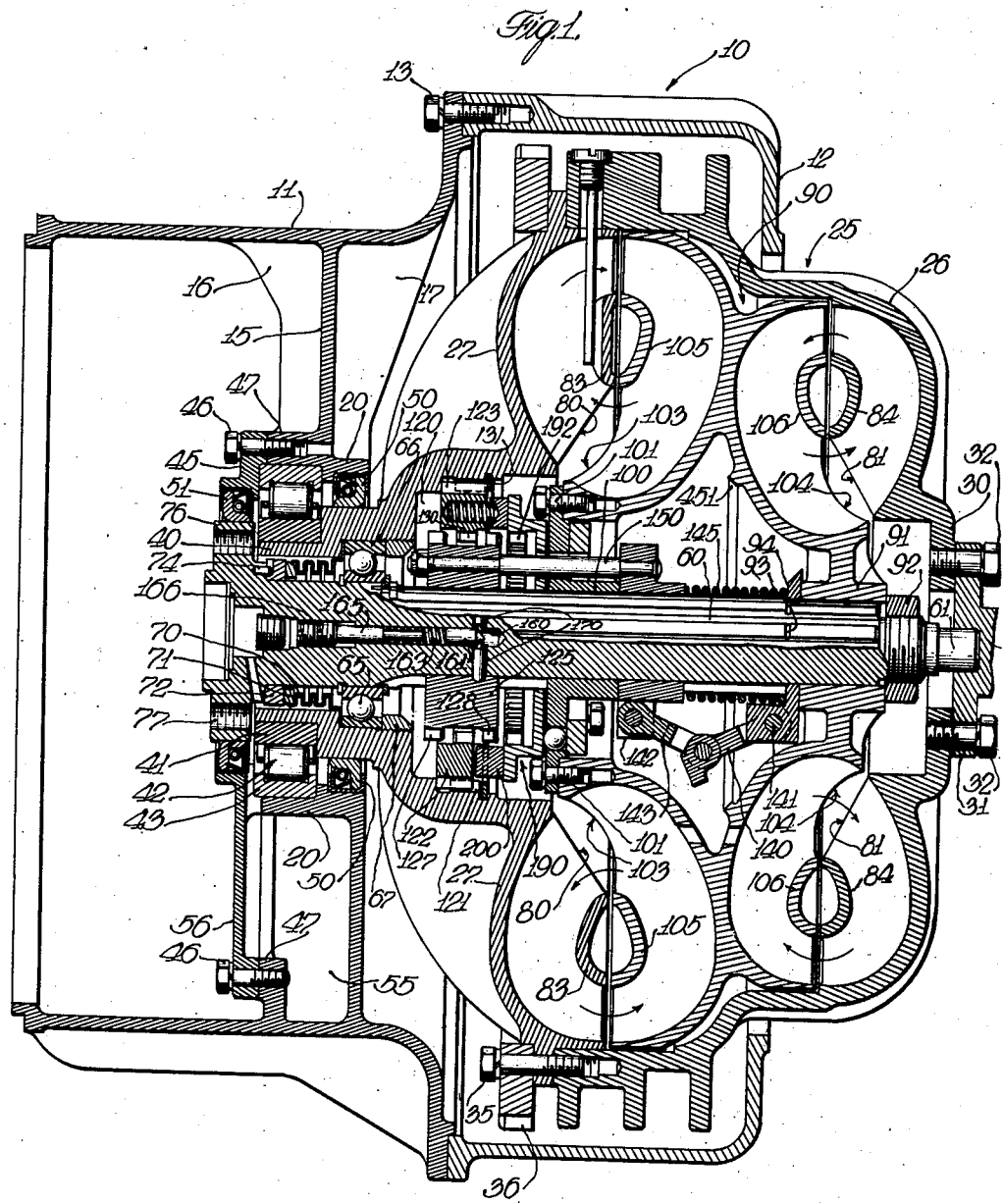
Figure 1 is a vertical longitudinal section taken through one form of my new and improved torque converter and transmitting mechanism, taken along the line 1—1 of Figure 2.

Referring now more particularly to Figure 1 of the accompanying drawings, the stationary housing or support for the torque converting and transmitting mechanism of the present invention is indicated by the reference numeral 10 and comprises two sections 11 and 12 suitably connected together by cap screws 13, or the equivalent, inserted through openings in the flange of the section 11 and threaded into the corresponding portion of the section 12 which may be provided with bosses or the like for that purpose. The housing section 11 includes an intermediate web or wall 15 having suitable reenforcing ribs 16 and 17. The intermediate wall 15 terminates radially inwardly in a centrally disposed bearing hub 20.

In the present construction, the fluid impeller or driving member is in the form of a rotatably mounted casing 25 formed in two parts, 26 and 27, the casing part 26 including a central flanged section 30 adapted to be secured and supported on the flange of a power driven shaft 31, such as the crank shaft of an internal combustion engine. For this purpose, cap screws 32 are provided and arranged in any manner suitable to the particular installation involved. It will be understood, of course, that any suitable source of power may be utilized, an internal combustion engine being mentioned as a source of power in common use today for automotive vehicles and the like.

Figure 2:
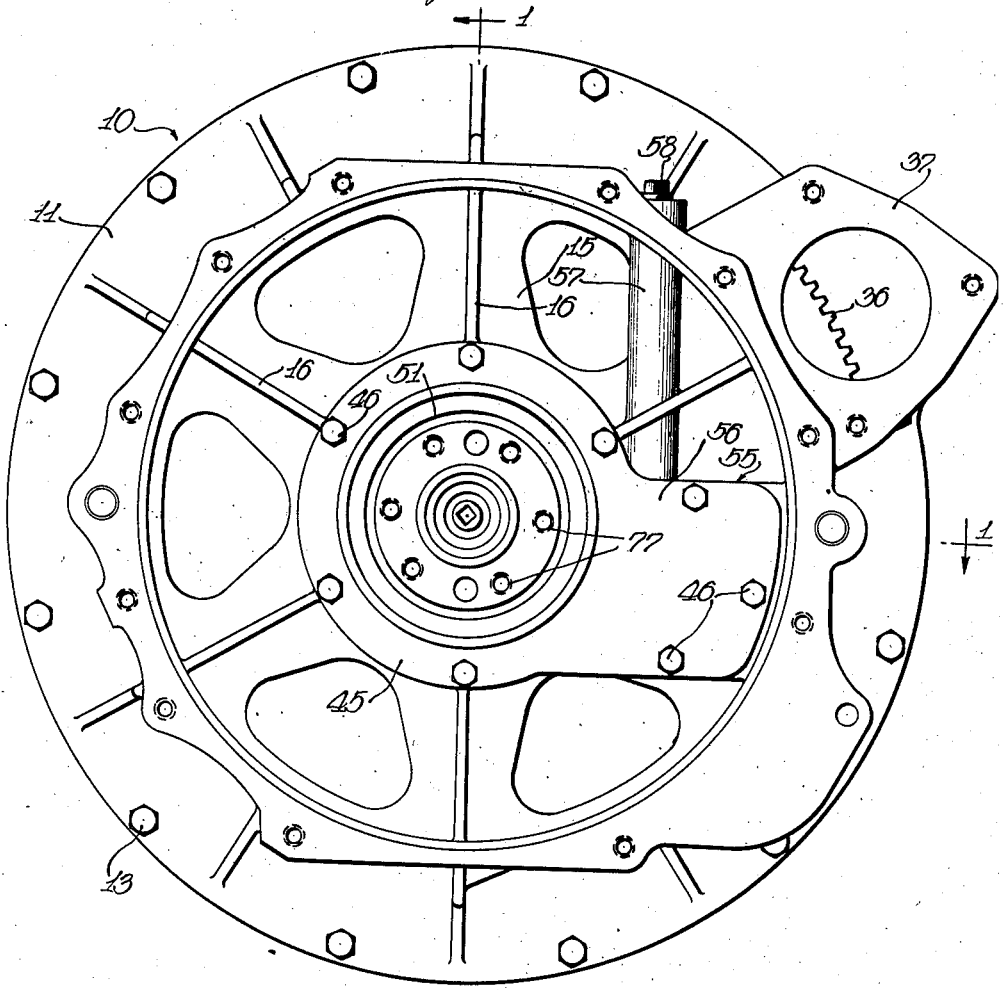
Figure 2 is an end elevation looking to the right of Figure 1.

The other driving casing section 27 is rigidly connected to the first casing section 26 by cap screws 35 or the like, and preferably these cap screws are utilized to mount a starter ring gear 36 on the driving member 25. In this case, therefore, the driving casing 25 and associated parts are utilized as a flywheel for the motor, represented by its crank shaft 31. As best shown in Figure 2, in order to utilize the ring gear 36, the stationary housing 10 is provided with a bracket 37 disposed in such a position as to receive a starting motor, the pinion of which is adapted to be meshed with the ring gear 36.

The bearing hub 20 of the housing section 11 is adapted to receive suitable bearings for supporting the driving casing section 27. For this purpose, the rear portion of the driving casing section 27 terminates in a reduced cylindrical section 40 which is adapted to receive the inner race 41 of a roller bearing assembly indicated in its entirety by the reference numeral 42 and including an outer race 43 which is seated in the bearing hub 20 of the housing section 11 and held in place therein by a cover plate 45 secured to the intermediate wall 15 by a plurality of cap screws 46 threaded into threaded bosses 47. The forward portion of the bearing hub 20 carries gasket means 50 of any suitable construction which, in connection with companion gasket means 51 carried by the cover plate 45, serves to prevent the loss of lubricant from the bearing means 42.

In this connection, as best shown in Figure 2, the intermediate wall 15 is formed with a lubricant chamber 55 closed by an extension 56 of the cover plate 45, and a tubular extension 57 including a filler plug 58 provides for supplying lubricant to the chamber 55 by which the bearing 42 is lubricated.

As mentioned above, the casing 25, supported at its forward portion on the crank shaft 31 of the motor and at its rear end by bearing means 42 on the intermediate wall 15, constitutes the driving member of the transmission. The driven parts include a driven shaft 60 which is splined for a portion of its length and is provided with a reduced forward end 61 which is piloted in a suitable bearing opening in the rear end of the crank shaft 31. Rearwardly of the splined section, the driven shaft 60 is provided with suitable anti-friction bearing 65 by which the rear end of the driven shaft 60 is supported on the rear portion of the driving casing section 27, as best shown in Figure 1, the bearing means 42 supporting this portion of the casing section 27, as described above. The bearing means 65 includes an outer race 66 seated in a suitable groove formed in the cylindrical portion of the driving casing section 27 and is held therein by a threaded ring member 67. A bellows gland seal 70 has its flange portion rigidly secured to the driving casing section 27, as by being interposed between the outer race of the bearing means 65 and the recess in the casing section 27. The rear portion of the bellows gland seal 70 is provided with an anti-friction ring 71 which seats against a second ring member 72 pinned or otherwise secured to the rear end of the driven shaft 60, as indicated in Figure 1 by the reference numeral 74. The rear portion of the driven shaft 60 terminates in a flange 76 which is provided with a plurality of threaded openings 77 adapted to receive suitable driving connections, such as a universal joint or the like, by which the drive from the transmission of the present invention is transmitted to other vehicle or driven parts.

For transmitting torque from the driving casing 25 to the driven shaft 60, fluid transmitting means is employed, according to the principles set forth in the patent to Herman Föttinger, No. 1,199,359, issued September 26, 1916. Such a fluid torque transmission device is known as a fluid flywheel by virtue of the capacity of the device to not only transmit torque but to act as a flywheel for the source of power. Generally, such a fluid flywheel utilizes the kinetic energy of a moving fluid which is set in motion by a suitably formed impeller. The fluid is delivered to a rotor or fluid impelled member which, by virtue of its rotation, absorbs the kinetic energy of the moving fluid and utilizes the same so that the energy imparted to the moving fluid rotates the driven parts of the device. One of the features of the fluid flywheel just referred to is that the member which imparts energy to the fluid transmitting means and the member in which the energy of the fluid is utilized are provided with vanes or the like which are so formed that the fluid is caused to circulate through passages in the impeller and to be delivered to passages in the rotor so that the fluid advances not only around the axis of rotation of the driving and driven members, but is also moved in a spiral path advancing around a circular axis, the fluid being continually delivered to the rotor or fluid impelled member which derives energy therefrom and returns the fluid again to the impeller or fluid impelling member, all as set forth in the patent mentioned above. The fluid impelling member or impeller is so designed that the centrifugal force, established by virtue of the rotation of the impeller, delivers the fluid at high velocity and comparatively low pressure into the rotor or fluid impelled member. Thus, both the members just mentioned are similar to turbine wheels of more or less conventional construction. It has been shown that a device of this character is capable of transmitting a considerable torque more or less independently of the speed of rotation of the driven member.

In utilizing these principles, the present invention forms the driving member or driving casing 25 in such a manner that two sets of driving or impeller blades or vanes are provided, indicated in Figure 1 by the reference numerals 80 and 81, respectively. As shown, these sets of blades or vanes 80 and 81 face each other, and the blades or vanes of each set are connected together by a curved wall which not only reenforces the blades, but serves to define a fluid channel referred to later. The curved wall for the set of blades 80 is indicated by the reference numeral 83 and the curved wall for the set of blades 81 is indicated by the reference numeral 84.

The rotor or fluid impelled member is indicated in its entirety in Figure 1 by the reference numeral 90 and comprises a casting or the like having a hub 91 mounted on the forward splined end of the driven shaft 60 and held thereon by means of a nut 92. These splines on which the hub 91 is mounted are of smaller diameter than the remaining splined portion of the driven shaft 60, thereby forming a shoulder 93 against which a collar 94 is disposed, and the collar 94 is engaged by the rear edge of the hub 91. The rear portion of the rotor 90 is supported upon a flanged collar 100, the latter being secured to the rotor 90 by cap screws 101 and the collar 100 being seated in non-rotatable relation on the splines of the driven shaft 60.

The driven rotor 90, like the driving member 25, also includes two sets of blades or vanes 103 and 104 connected together, respectively, by curved walls 105 and 106. From Figure 1 it will be noted that the driving and driven members, 25 and 90, are arranged in such relative positions that the blades or vanes 80 and 103, as well as the blades or vanes 81 and 104, form a closed channel or passage system or circuit in the shape of a gyratory or vortex ring in which a confined fluid may circulate in a smooth flow.

In transmitting the torque from the driving member 25 to the driven member 90, the flow of the fluid, which is preferably a liquid having small internal friction, is indicated by the arrows in Figure 1. As the driving member 25 rotates, the impeller vanes 80 and 81 cause the confined liquid to rotate therewith. This movement of the liquid is from the axial center of the impeller 25 to the periphery thereof due to the centrifugal force of the whirling liquid. Centrifugal force causes the liquid to be ejected from the outer margins of the vanes 80 and 81 across the relatively small space between the member 25 and the member 90 to the latter where the kinetic energy of the moving liquid is imposed on the blades or vanes 103 and 104 of the driven rotor. Thus, the force exerted on the rotor is dependent on the weight and velocity of the fluid.

After the liquid has been thrown against the blades 103 and 104 of the rotor 90, the liquid flows radially inwardly toward the driven shaft 60 where it is caused to reenter the driving member or impeller 25. Here the liquid again has its velocity increased and is again thrown by centrifugal force against the rotor 90. In this manner, and moving in the closed circuits illustrated, the fluid transmitting medium continually circulates, flowing radially outwardly of the driving member 25 and radially inwardly of the driven member 90 in alternate relation, receiving energy from the former by having its velocity increased and delivering energy to the latter by having its velocity decreased or its direction changed, or both, as will be understood.

In this type of device, substantially the maximum torque can be imposed on the driven member 90, even though the latter has not begun to rotate, the difference between the rotation of the driving and driven members being taken up by what is known as the slip in the liquid. As the driven member yields and begins to rotate, the slip becomes less until at the higher speeds the driving and driven members rotate substantially at the same speed. Tests have shown that under these conditions the slip may be as little as 2%. Practically speaking, therefore, under these conditions, the driving and driven members are hydraulically locked together so that the entire device rotates as a unit and may, therefore, act as a flywheel for the crankshaft 31, as referred to above.

It is to be noted that the formation of the driving member 25 as a casing, and by virtue of its tight connection with the flange 31 of the engine crank shaft and by virtue of the bellows seal 70 with the driven shaft 60, a leak tight housing is provided for the confined fluid so that substantially no loss can occur. In the construction illustrated in Figure 1, two separate circuits are shown, but it is to be understood that a greater or lesser number of such circuits may be employed, depending upon the torque desired for predetermined dimensions or vice versa.

As mentioned above, one of the principal purposes of the present invention is the provision of means adapted to mechanically and positively connect the driving and driven members of the transmission device so that they are positively caused to rotate together. To this end, therefore, the present invention provides governor controlled clutch mechanism which will now be described. A chamber 120 formed in the rear portion of the driving casing section 27 is provided with a toothed circumferential wall 121 which receives a clutch member 122 having a toothed exterior 123 whereby the clutch member 122 may be slid axially of the driving casing section 27 into non-rotatable relation with respect thereto. Of course, any securing means permitting the assembly and attachment of the clutch member 122 in the driving casing section 27 may be utilized. A companion clutch member 125 is splined onto the driven shaft 60 and is provided with two sets of teeth 127 and 128 and is adapted to be shifted axially along the driven shaft 60. The sets of teeth 127 and 128 are spaced apart axially of the splined clutch member 125, and disposed between the sets of teeth 127 and 128 is a third set of clutch teeth 130 carried by the clutch member 122. The clutch member 122 is retained in position in the chamber 120 by means of a spring ring 131 or the equivalent.

For shifting the clutch member 125 axially so as to engage the teeth 127 on the clutch member 125 with the teeth 138 on the clutch member 122, speed responsive means is provided and so actuated that the clutch member 125 is not shifted until the driving and driven members 25 and 90 rotate at substantially the same speed or some other desired relation. Preferably, this is accomplished by centrifugal governor mechanism. The collar or washer 94, which is splined onto the driven shaft 60, is provided with a plurality of hinged weights 140 hinged thereto by pins 141. Preferably, three weights are provided, but the number of these parts may, of course, vary. A collar 142 is also splined onto the driven shaft 60, and this collar is connected, as by links 143, with the weights 140. A spring 145 of relatively light tension is disposed between the collar or washer 94 and the collar 142 and serves to press the latter against the flanged collar 100, as clearly shown in Figure 1.

A plurality of rods or links 150 are riveted to the collar 142 and are extended axially of the driven shaft through suitable openings in the flange of the collar 100 and into suitable openings in the shiftable clutch member 125. Preferably, the rods 150 are secured to the shiftable clutch member 125 by nuts or the equivalent, the central portion of each of the rods 150 being enlarged to provide shoulders maintaining the clutch member 125 and the shiftable collar 142 in proper spaced relation.

As will be clear from the above description, as the rotor 90, together with the driven shaft 60 to which it is secured, gains speed, the weighted governor arms 140 will be thrown outwardly under the influence of centrifugal force and will act through the links 143 to shift the collar 142 and the shiftable clutch member 125 connected to it by the rods 150 to the right as viewed in Figure 1, thereby tending to engage the teeth 127 on the clutch member 125 with the teeth 138 on the clutch member 122 secured to the driving casing 25. Preferably, however, this action is delayed until the driving and driven members, 25 and 90, are rotating at substantially the same speed and at a more or less predetermined rate. To this end, snap mechanism serving to delay the clutching engagement has been provided and will now be described.

The rear end of the driven shaft 60 carries a plurality of bores 160 in the innermost one of which is disposed a plunger 161 having a rounded or conical nose 162 (see Figure 3) and biased for movement toward the right, as viewed in Figure 1, by a spring 163. Means for adjusting the tension of the spring 163 is provided in the form of an adjustable plunger rod 165 which is retained in any position of adjustment by a lock plug 166 or the equivalent.

Adjacent the innermost end of the inner bore 160 a pair of transverse bores are provided, and in each of these transverse bores there is disposed a plunger or poppet 170 having rounded or conical inner ends cooperating with the rounded or conical end 162 on the spring pressed poppet plunger 161. The poppets 170 are each provided with a rounded or conical outer end which is adapted, in the position shown in Figures 1 and 3, to be disposed in a groove or recess 173 (see Figure 4) formed in the shiftable clutch member 125. The poppets 170 are of such length that when their outer ends are disposed in the recesses 173, the rounded or conical inner ends of the poppets are disposed against the nose 162 of the poppet plunger 161.

Figure 4:
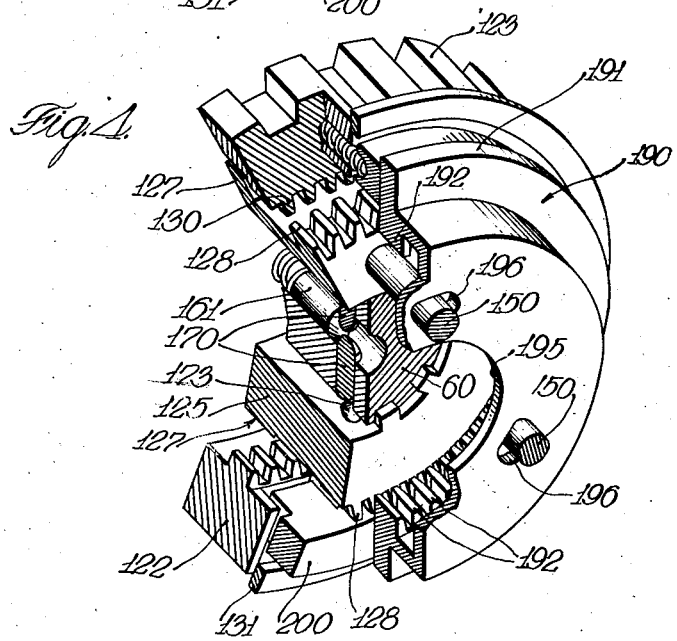

When the driven shaft begins to turn, the centrifugal governor weights 140 tend to swing radially outwardly under the influence of centrifugal force and exert a tension on the rods 150 in an effort to shift the clutch member 125. However, the shifting of the clutch member 125 is delayed by virtue of the tension of the spring 163 against the poppets 170, this tension acting through the plunger 161 to yieldingly hold the poppets in the position shown in Figures 1 and 2. As the speed of the driven shaft 60 reaches a given value, the force of the governor weights 140 becomes sufficient to overcome the resistance offered by the poppets 170. When once this resistance is overcome and the poppets 170 are forced inwardly of the driven shaft 60 and out of the notches or recesses 173, the poppets no longer offer any material resistance to the movement of the shiftable clutch member 125, and therefore the entire force of the rotating governor weights 140 becomes immediately effective to shift the clutch member 125. Figure 4 illustrates the position of the clutch member 125 in this condition.

Figure 3:
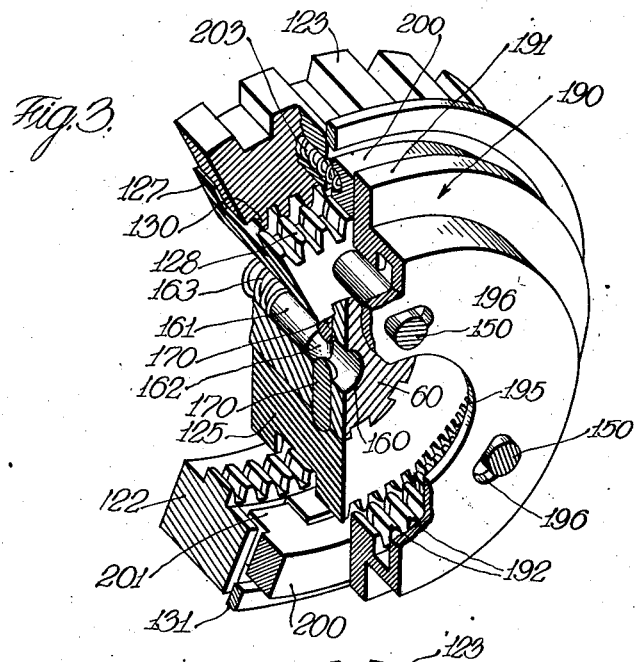
Figures 3, 4 and 5 are fragmentary perspective views illustrating the construction and operation of my governor controlled clutch for mechanically connecting the driving and driven parts together.
Figure 5:
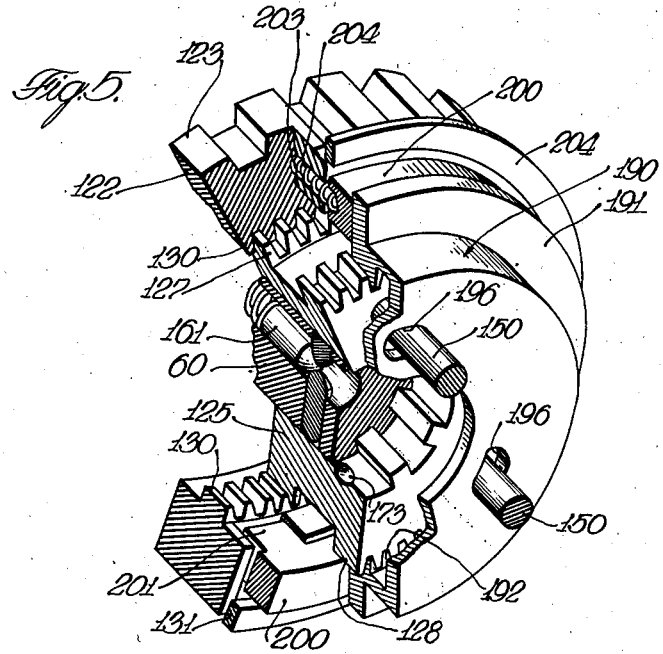

Referring now more particularly to Figures 3, 4 and 5, and remembering that another important object of the present invention is the provision of means preventing the mechanical engagement of the driving and driven parts of the transmission unless and until such parts are rotating at substantially the same speed, the present invention provides synchronizing mechanism which is operative to halt the shifting movement of the splined clutch member or hub 125 just described so as to prevent the engagement of the teeth 127 with the teeth 138 until synchronous speed has been attained. In order, therefore, to further delay the engagement of the mechanical clutch, the present invention provides a synchronizing gate indicated in its entirety by the reference numeral 190 and consisting of flanged section 191 and an interior toothed section 192 adapted to be disposed in the path of movement of the teeth 128 on the shiftable clutch hub 125 to halt the movement of the clutch hub until synchronous speed has been attained.

The synchronizing gate 190 is mounted on the splines of the driven shaft 60 for rotation with respect thereto, the rotary movement of the synchronizing gate with respect to the driven shaft 60 being limited to an extent approximately equal to one-half the pitch of the teeth 128 and 192, these two sets of teeth having the same pitch. In order to thus limit the rotation of the synchronizing gate 190, the latter is provided with a central portion 195 adapted to seat on the splines of the driven shaft 60 and is provided with slots 196 to receive the rods 150. The slots 196 are longer than the diameter of the rods 150 by an amount which is equal to one-half the pitch of the teeth 128 and 192. By virtue of this construction, therefore, the synchronizing gate may be moved with respect to the driven shaft 60 on which the shiftable clutch hub 125 is splined from a position in which the teeth 128 will abut against the teeth 192, as shown in Figure 4, to a position in which these teeth can be meshed to allow the shiftable clutch hub 125 to complete its shifting movement, as shown in Figure 5.

Figure 3 represents the position of the parts before the centrifugal governor weights 140 have exerted sufficient force to force the poppet plunger 161 back against the tension of the spring 163.

Figure 4 shows the position of these parts after the resistance of the poppets 161 and 170 has been overcome but where the synchronizing gate 190 is in such a position that the teeth 192 are in the way of the teeth 128 so that further shifting movement of the shiftable clutch member 125 is prevented, thus preventing the engagement of the clutch teeth 127 with the clutch teeth 130.

Figure 5 illustrates the position of the parts after the synchronizing gate 190 has been shifted to permit the shiftable clutch hub 125 to move relative to the driven shaft 60 so as to engage the clutch teeth 127 with the clutch teeth 130, thereby effecting a mechanical and positive driving connection between the driving and driven members 25 and 90. It will be noted that the synchronizing gate 190 has been shifted relative to the rods 150 so that the latter lie in the ends of the slots 196 opposite to the position in which they lie in Figure 4.

The means for effecting the shifting of the synchronizing gate at the proper moment is entirely automatic, such shifting of the position of the gate being accomplished the moment the speed of the driven rotor begins to exceed the speed of the driving impeller casing 25. As best shown in Figures 1 and 3, a friction drive washer 200 is keyed, as at 201, to the clutch member 122 which, it will be remembered, is in fixed engagement with the driving impeller casing 25. By virtue of the keyed connection 201, the friction drive washer 200 is capable of limited axial movement with respect to the clutch member 122, there being a plurality of springs 203 disposed in suitable bores 204 formed in the clutch member 122 to accommodate these springs. As will be clear from Figures 3, 4 and 5, the springs 203 act to force the friction drive washer 200 toward the flanged portion 191 of the synchronizing gate 190. At all times, therefore, the synchronizing gate 190 is in frictional engagement with the driving clutch member 122, and by virtue of this frictional engagement, the synchronizing gate 190 tends to rotate with the driving clutch member 122. However, the gate 190 cannot rotate with the driving clutch member 122 except through a limited arc since it is connected to the driven shaft 60 by virtue of the slotted connection 196 with the rods 150. The frictional engagement between the washer 200 and the flange 191 of the synchronizing gate tends to retain the synchronizing gate in the position shown in Figures 3 and 4 as long as the driving impeller casing 25, and therefore the driving clutch member 122, rotates at a higher speed than the driven parts of the transmission, including the driven shaft and the shiftable clutch hub 125 splined thereon. Thus, since the impeller is always, when driving, rotating at a speed higher than the rotor 90, the gate is continually urged ahead of the rotor, the gate 190 being held in the position shown in Figures 3 and 4 with one end of the slots 196 against the rods 150. Thus, the gate teeth 192 are held in line with the teeth 128, the position shown in Figures 3 and 4, in which they will prevent the clutch hub 125 from completing its movement, even though the governor weights 140 have exerted sufficient force to initially shift the clutch hub 125 and to overcome the resistance offered by the spring pressed poppets 170.

Now in order to provide for the movement of the synchronizing gate out of the way of the teeth 128 so as to permit the shiftable clutch hub 125 to complete its movement and engage the driving clutch member 122, the driving impeller 25 is momentarily retarded. Preferably, this is done by manipulation of the engine throttle to reduce the speed of the driving impeller. When the driving member 25 begins to slow down, the momentum of the vehicle or other machinery connected with the driven shaft 60 serves to drive the shaft 60 and the rotor 90 ahead of the driving clutch member 122. Due to the fluid slip between the rotor 90 and the driving impeller 25 and the inertia of the latter and associated parts, the rotor will tend to drive the impeller, but the rotor will start to rotate faster than the impeller 25. At the moment this reversal of relative rotation occurs, the synchronizing gate 190 will lag behind with the clutch member 122 and the impeller, and the shiftable clutch member 125 will advance with respect to the synchronizing gate which is frictionally connected with the clutch member 122, the rods 150 moving to the opposite end of the slots 196, as shown in Figure 5. Such relative movement will bring the teeth 128 out of line with the synchronizing gate teeth 192 so that now the shiftable clutch hub 125 is free to move and the centrifugal governor mechanism 140 will complete the engagement of the clutch members 122 and 125, thereby effecting a mechanical direct drive between the driving and driven members 25 and 90.

From the description so far, as given above, it will be noted that according to the present invention a transmission has been provided in which the drive is transmitted through a fluid flywheel arrangement in which a substantially constant amount of torque can be applied to the driven parts. However, when the speed of rotation of the driven parts has reached a given value, centrifugal governor mechanism comes into action and attempts to establish a mechanical direct drive between the driving and driven parts of the transmission. The establishment of this direct mechanical connection is delayed, however, until, not only has the speed of the driven parts reached a given and predetermined value, but also until the driving and driven parts rotate in substantial synchronism, the establishment of synchronous speed by momentarily retarding the speed of the normally driving parts or by any other means serving to automatically allow the governor mechanism to complete the positive mechanical direct connection.

Where devices of this type are installed in automobiles and the like to provide so-called automatic transmissions, it is usually desirable that the speed of the automobile shall reach a certain value, say ten or fifteen miles per hour, before the mechanical direct connection is to be established. This speed or this value may, however, vary within wide limits, depending upon the operating characteristics desired, and of course it will be understood that transmissions of this type may be installed in machines other than automobiles.

It is also usually desirable that the reverse of the above operation shall not take place until the speed of the automobile shall have been reduced to a low value, usually materially lower than the value at which it is desired to insert the mechanical direct connection in the first place. Thus, in order that the automobile will remain in direct drive or high speed with the motor idling or substantially so, it is desirable that the mechanical direct drive shall not be disconnected until the speed of the automobile shall have been reduced to, say, five miles per hour, idling speed of the motor.

The present invention is admirably adapted to secure these relations. For example, from the above description it will be evident that the poppet means 161—170 may be made so stiff or strong that the direct drive engagement will only occur after the driven shaft rotates at relatively high speed, corresponding to relatively high speed of the automobile or other machinery for which the transmission of the present invention is incorporated. As mentioned above, the tension of the spring 163 may be adjusted by screwing in or out the plunger 165. As will be apparent, the restoration of the hydraulic drive after the mechanical direct drive has been engaged is effected by the shifting of the clutch hub 125 back to the position shown in Figure 1, and this is accomplished by returning the collar 142 to its position against the flanged collar 100. As the speed of rotation of the driven shaft 60 reduces, the centrifugal force of the governor weights 140 is likewise reduced and will finally reach a point where the spring 145 is strong enough to shift the clutch hub 125 back to its original position, acting through the shiftable collar 142 and the rods 150. This return spring 145 may, therefore, be made so light that the return of the shiftable clutch hub 125 can occur only when the crank shaft 31 is allowed to idle or at a point only slightly in excess of the idling speed of the engine. Therefore, after once accelerating the vehicle through its lower speeds and once reaching a speed at which the direct drive can be engaged by momentarily retarding the engine throttle and allowing the governor mechanism 140 to shift the clutch member 125 into engagement with the companion clutch member 122, direct mechanical engagement will be retained until the engine throttle is closed and the vehicle retarded to almost a stop. In other words, the relatively light force which the spring 145 can exert determines the point at which the hydraulic drive is reestablished, while the point at which the mechanical direct drive is established is determined by the tension of the poppet mechanism 161—170, each acting more or less independently of the other. Therefore, after once effecting the direct drive engagement, the vehicle may be driven through the direct drive without using the fluid flywheel, even though the vehicle speed falls off to the lowest at which the engine will handle it while in direct drive.

Turning now to Figure 6 where I have shown a fluid flywheel with governor controlled mechanism for effecting a mechanical direct connection between the driving and driven parts and, in addition, certain new and useful improvements in the hydraulic mechanism, the reference numeral 250 indicates a stationary supporting casing or housing formed in two sections 251 and 252 and serving about the same purpose as the housing 10 described above. The housing section 251 includes a central bearing plate 253 secured to the section 251 by cap screws 254 or the equivalent. In Figure 6, the driving impeller is indicated in its entirety by the reference numeral 258 and consists of a casing section 259 adapted to be secured to the crank shaft 31 of an engine or other source of power in substantially the same way as described above for the form of the invention shown in Figure 1. The other casing section of the driving impeller is indicated by the reference numeral 260 and is secured to the section 259 by cap screws 261 which are also utilized to connect the starter ring gear 262 with the impeller 258.

The impeller 258 is provided with blades or vanes 265 connected together by a central curved wall 266 which serves to define the path for the fluid transmitting medium.

The driven shaft is indicated by the reference numeral 270 and is supported, as at 271, in the crank shaft 31 by a pilot bearing 272 or the equivalent. The rear end of the driven shaft 270 is supported by bearing means 274 supported by the bearing plate 253 attached to the housing section 251 as described above. The bearing means 274 includes an outer race 275 which is held in place by means of a slot and spring ring 276 and by a cover plate 277 secured to the bearing plate 253 by cap screws 280. The inner race 281 of the bearing means 274 bears against a spacing washer 282 which, in turn, bears against the inner race 283 of a second set of bearings 285, later to be referred to, the inner race 283 seating against a shoulder formed on the driven shaft 270. A collar 287 is mounted on the rear end of the driven shaft 270 and presses against the flange of a bellows gland seal 290, the collar 287 being held in place by means of a threaded ring member 291. The end of the bellows gland seal 290 opposite the flange is provided with a friction ring 293 which seats against a companion ring 294 carried by the cover plate 277. This construction prevents the escape of fluid from the rear end of the housing 250 where the driven shaft 270 emerges.

The rotor is indicated in its entirety by the reference numeral 300 and is similar to the rotor described above in connection with Figure 1 except that, in Figure 6, the rotor has been made into two relatively movable members. The first rotor section 301 includes blades or vanes 302 adapted to receive the liquid thrown out from the impeller blades 265. The rotor section 301 also includes a hub 305 splined or keyed onto the driven shaft 270 to rotate therewith and is held thereon by a threaded ring 310.

The second rotor section is indicated by the reference numeral 315 and under certain conditions of operation serves as a stationary member or stator and will hereinafter be referred to as the stator. The member 315 is keyed or otherwise secured to the forward end of a sleeve or tubular member 316, being held in place thereon by a threaded ring 317. The tubular member 316 is supported on the driven shaft 270 by a plurality of roller bearings 320 and by the bearing means 285 referred to above, the latter bearing means including an outer race 321 held in place in the tubular member by a spring ring 323 or the equivalent. The rear end of the tubular member 316 terminates in a radially outwardly disposed ratchet flange 325 which serves the purpose, in connection with other parts to be described, of preventing the tubular member 316, and hence the stator 315 as well, from rotating relative to the housing 250 in one direction but providing for its rotation in the other direction. The ratchet flange 325 and its associated structure is a one-way brake in the nature of an overrunning clutch, and any form of one-way brake or overrunning clutch mechanism may be provided within the scope of the present invention.

Figure 7 shows one form of overrunning clutch structure which includes a plurality of pawls 330 pivoted by pins 331 to lugs 332 or the equivalent carried by the central portion of the stationary housing section 251. Each of the pawls 330 is provided with an end 335 adapted to engage one of the ratchet teeth on the flange 325 to prevent backward rotation of the tubular member 316 on its bearings 285 and 320 carried by the driven shaft 270. As will be clear from Figure 7, however, the tubular member 316 is free to rotate in one direction with respect to the housing section 251, that direction being indicated by the arrow in Figure 7.

It is desirable to hold the pawls 330 entirely out of engagement with the ratchet 325 when the tubular member 316 is overrunning the housing 250 under conditions which will be referred to later. In order to hold the pawls out of engagement with the ratchet 325, a cam ring or control disc 340 is provided and which is mounted on the tubular member 316 adjacent to and in frictional engagement with the ratchet flange 325 but held against more than a limited amount of rotation with respect to the stationary housing 251 by pins 341 carried by the pawls 330 and disposed in slots 342 formed in the control disc 340. The frictional engagement between the control disc 340 and the ratchet flange 325 is established by means of a friction ring 345 riveted or otherwise firmly secured to the control disc 340 and disposed in a shallow groove 346 formed therein. Preferably, the friction ring 345 is riveted to the control disc 340 as by rivets 347.

The ring or disc 340 is yieldingly pressed against the flange 325 on the stator sleeve 316 by means of a thrust bearing ring 350 including anti-friction balls 351 (see Figure 7) and connected with a radially inwardly disposed flange portion 353 on the stationary housing 251 by means of springs 355 or the equivalent disposed in suitable openings formed in the thrust ring and the flange 353. Preferably, means is provided for preventing relative rotation between the thrust ring 350 and the flange 353.

From the above description of the one-way brake construction, it will be clear that the stator sleeve 316 is prevented from rotating in a counterclockwise direction as viewed in Figure 7 but is permitted to rotate in a clockwise direction. In doing so, the frictional engagement between the control disc 340 and the flange 325 will cause the disc 340 to move a limited amount relative to the pawls 330. The slots 340 are formed with inclined portions 360 which cooperate with the pins 341 to move the pawls out of engagement with the teeth on the ratchet 325 and to hold the pawls in this position as long as the stator sleeve 316 rotates in that direction relative to the stationary housing 250. A soon, however, as the stator sleeve 316 tends to rotate in a counter-clockwise direction as viewed in Figure 7, the control disc 340 will be rotated in the same direction to free the pawls 330 to allow them to engage in the ratchet teeth on the flange 325. For this purpose, spring means 365 or the equivalent may be provided for moving the pawls 330 toward the ratchet flange 325.

The stator 315 is provided with blades or vanes 375 connected together by a curved peripheral wall 376, and the rotor blades or vanes 302 are similarly connected together by a curved wall 377.

The impeller 258 is supported, as in the previous modification, at its front end on the crank shaft 31 of the motor and at its rear end the impeller 258 is supported by bearing means 380 carried by the tubular stator sleeve 316. The bearing means 380 includes an outer bearing race 381 held in place in the impeller 258 by means of a threaded ring 383. A bellows gland seal 385 is provided between this portion of the impeller 258 and the flanged portion 353 of the stationary housing 250.

The vanes or blades 265, 302 and 375 and the associated walls are so formed and shaped that a maximum turbine action and the most efficient return of the power transmitting fluid is secured. More specifically, the rotation of the impeller 258 causes the power transmitting medium, which is preferably a liquid, to be thrown or discharged from the impeller by virtue of the centrifugal force which, as in the previously described modification, is dependent upon the peripheral speed of the impeller and the weight of the fluid. The kinetic energy thus imparted to the fluid is imposed upon the blades or vanes 302 of the rotor 300, and the energy due to the residual velocity of the fluid is imposed on the stator blades 375. These blades or vanes by virtue of the ratchet means described above cannot rotate backwardly under this reaction and hence they serve to change the direction of the liquid thus ejected from the rotor blades and to redirect the liquid back into the impeller in the most efficient manner to secure the greatest torque multiplication in the driven shaft 270 possible by a single stage turbine. In thus redirecting the liquid discharged from the rotor 300 and directing the same into the impeller 258, the member 315 acts as a true stator or stationary member, being held against rotation in a direction to take the reactions involved by virtue of the pawls 330 described above.

After the rotor 315 has attained a speed at which the peripheral velocity thereof is as great or greater than the speed at which the power transmitting fluid is ejected out of the rotor and into the stator, the fluid will then tend to drive the stator along with the rotor and impeller. Now, by virtue of the one-way brake mechanism described above which now serves as overrunning clutch means, the member 315, which formerly served as a true stator, is permitted to rotate with the impeller 258 and the rotor 300 in the direction of the arrow in Figure 7. At this time the impeller and rotor or turbine wheel act as a hydraulic flywheel and the power may be applied to the impeller 258 until the speed of the rotor 300 reaches approximately the speed of the impeller.

The hydraulic unit thus described is thus capable of serving automatically in two capacities. In the first place, in getting under way, considerable torque multiplication is possible by virtue of the construction wherein the stator 315 serves to redirect the fluid back into the impeller with undiminished velocity, and then as the speed of the rotor 300 increases the construction and arrangement of the stator is such that it does not limit the hydraulic unit to the torque multiplication secured initially but, by virtue of the one-way brake construction, the stator is permitted to rotate with the rotor in the direction in which the latter is driven, so that the rotor unit may be hydraulically driven at substantially one to one ratio with reference to the impeller unit.

Like the form of the invention shown in Figure 1, Figure 6 illustrates the provision of a mechanical clutch construction adapted to secure a positive mechanical and direct connection between the driving and driven parts under the control of governor mechanism and synchronizing mechanism. Generally, the governor mechanism and synchronizing mechanism, as well as the mechanical clutch, are of substantially the same construction as described above, there being certain variations to accommodate the somewhat different positioning of the rotor relative to the impeller.

The front portion only of the driven shaft 270 is splined, and mounted on this portion is a shiftable clutch hub 400 having two sets of teeth 401 and 402 spaced apart axially to accommodate a third set of clutch teeth 405 carried by a clutch member 406 having a toothed engagement with the impeller casing 259 in substantially the same way that the clutch member 122 is connected with the impeller casing in Figure 1.

The shiftable clutch member 400 carries a plurality of lugs 410 to which governor arms 411 are hinged, as by hinge pins 412. The governor arms 411 are weighted, as at 413, and are connected by means of links 415 with sets of anchoring lugs 416 carried by the rotor hub 305. The links 415 are connected with the lugs 416 by pivot pins 417 or the equivalent.

Poppet mechanism is provided for opposing the movement of the shiftable clutch hub 400 until the rotation of the driven shaft 270 is such that a given force is available for shifting the shiftable clutch member. The driven shaft 270 is provided with an axial bore 420 in which is disposed a poppet plunger 421 biased for movement in one direction by a poppet spring 422 and held thereby against a pair of poppets 423 disposed in transverse bores formed in the driven shaft 270. The poppet spring 422 is capable of adjustment by means of a rod 425 and a pair of locking plugs 426. The rear end of the bore 420 is closed by means of a plug 429.

The poppets 423, like the poppets 170 described above, have their ends rounded or conical, and the radially outer ends of the poppets 423 are adapted to engage in an interior groove or notch formed in the shiftable clutch member 400. Thus, the clutch member 400 will not be shifted axially along the splines on the driven shaft 270 until the centrifugal governor 411 exerts sufficient force to overcome the poppets. As soon as this occurs and the clutch member 400 is shifted sufficiently to force the poppets 423 inwardly, the poppet mechanism no longer offers material resistance to movement of the clutch member. However, at this time, the form of the invention shown in Figure 6 provides means for imposing a synchronizing gate to resist further movement of the clutch member 400 until the driving and driven parts of the transmission are rotating in substantial synchronism.

In Figure 6, the synchronizing gate is indicated by the reference numeral 435 and rotates with the driven shaft 270 but is capable of limited rotation relative thereto. To this end, a friction washer 440 is keyed to the clutch member 406 to rotate therewith but is allowed to have axial movement with respect thereto and is biased for movement toward the synchronizing gate 435 by a plurality of springs 441. The synchronizing gate 435 is prevented from moving axially under the influence of the spring pressed friction ring 440 by means of a backing plate 445 which is attached to the rotor 300 and which is provided with a plurality of anti-friction balls 446 against which the synchronizing gate 435 is pressed.

The action of the synchronizing gate 435 is substantially the same as the action of the synchronizing gate 190 described above. As long as the impeller 258 is rotating faster than the rotor 300, the friction drag between the gate 435 and the friction washer 440 is sufficient to hold the synchronizing gate in such a position that the teeth thereof aline with the set of teeth 401 on the shiftable clutch member 400 to prevent the latter from moving axially under the influence of the centrifugal force of the governor arms. As soon, however, as the speed of the impeller 258 is reduced so that the rotor 300 tends to overrun the impeller, the friction between the synchronizing gate 435 and the friction ring 440 is sufficient to move the synchronizing gate to permit these teeth 401 to move in between the teeth 446 to allow the shiftable clutch member 400 to complete its movement. When this movement is completed the direct engagement between the driving and driven parts is effected by the teeth 402 meshing with the clutch teeth 405.

The clutch member 400 is returned to the position shown in Figure 6 by a relatively light spring 450, and the tension of this spring and of the poppet mechanism 421—425 may be arranged independently of each other so as to provide for the engagement and disengagement of the mechanical direct connection as desired.

The radially outward swinging movement of the weighted governor arms 411 is limited by the engagement of the arms with the walls of the impeller, and the same is true of the form of the invention shown in Figure 1. In both cases, the outermost ends of the governor arms are formed to engage stop shoulders or the equivalent, indicated in both Figures 1 and 6 by the reference numeral 451.

The operation of the unit shown in Figure 6 is fully automatic as is the operation of the unit shown in Figure 1. In starting up the machine, the impeller 258 may be driven at sufficient speed to secure the maximum torque from the motor, the starting torque being multiplied according to the form, shape and construction of the impeller, rotor and stator blades 265, 302 and 375. As soon as the impeller 300 reaches a predetermined speed, the stator 315 automatically changes its character from one in which torque multiplication is possible to one in which a hydraulic direct connection may be established. Continued rotation of the impeller 258 therefore drives the rotor 300 at an increased ratio, that is, one in which the torque multiplication is reduced, and then as soon as substantially synchronous speed has been attained and the speed of the motor momentarily reduced, the mechanical direct connection is established, dependent, however, upon the concurrence of two factors, namely, upon the attainment of sufficient speed of the driven shaft 270 so that the governor mechanism will exert sufficient force to overcome the poppets 423 and, second, upon the occurrence of synchronism between the rotor and the impeller so that the synchronizing gate 435 will be moved out of the path of movement of the shiftable clutch hub 400.

Where the hydraulic units described above are employed in automotive vehicles and the like, it is generally necessary to provide a friction clutch and reverse gearing, and since these may be of conventional formation they have not been illustrated in the drawings. In the form shown in Figure 1, it may also be desirable to provide one stage of gear reduction since no torque multiplication of any appreciable value is feasible in hydraulic flywheels or the like where the two driving and driven members form the entire circuit for the fluid transmitting medium. In the form of hydraulic unit shown in Figure 6, however, considerable torque multiplication and consequent speed reduction may be secured. Moreover, according to the principles of the present invention where the stator has the two functions indicated above, after the one stage of torque multiplication has been secured, the device automatically functions as a hydraulic flywheel in which the driving and driven members now constitute the entire fluid circuit, the device then operating to transmit torque at a different ratio. Such two ratios are secured automatically and without any attention on the part of the operator whatsoever and at such times that the change of ratio is feasible under the load and other conditions which exist.

These features are of particular importance where internal combustion engines are employed since it is well known that unless such engines are driven at their rated speed or nearly so, the available torque falls off rapidly. The hydraulic units described above therefore form transmission devices which enable the source of power to develop sufficient torque or less independently of the speed of rotation of the driven member or impeller. At the same time, after the proper speed has been attained, all hydraulic losses and the like are avoided by virtue of the automatically operating mechanical direct connecting clutch which connects the driving and driven parts to cause them to rotate together, such connection being automatically effected by the simple operation of momentarily reducing the speed of the engine. So far as I am aware, the provision of a fluid flywheel, or of a torque converter, and a centrifugally operated and synchronized mechanical direct drive is new.

While I have described above the preferred construction in which the principles of the present invention have been embodied, it is to be understood that my invention is not to be limited to the specific means shown and described but that, in fact, widely different means may be employed in the practice of the broader aspects of my invention.

What I claim, therefore, and desire to secure by Letters Patent is:

1. In combination, a torque converter comprising fluid-connected driving and driven members, means biased in response to the speed of rotation of the driven member for mechanically connecting both of said members together, and means for preventing said mechanical connection until the speed of the driven member is substantially equal to the speed of the driving member.

2. A transmission comprising driving and driven members, means for clutching said members together to cause them to rotate at a one-to-one ratio, centrifugal governor mechanism controlling said means, snap action means offering a substantial force opposing actuation of said governor mechanism in one direction only and offering substantially no force opposing actuation of said governor mechanism in the other direction, and means biasing said mechanism for actuation in said other direction with a lesser force.

3. A transmission comprising driving and driven members, means for clutching said members together to cause them to rotate at a one-to-one ratio, centrifugal governor mechanism controlling said means, means to delay actuation of said mechanism in one direction until a given speed has been attained and including a biased member movable to an inoperative position after the attainment of said given speed, whereby movement of the governor mechanism in said one direction is no longer opposed, and separate means including a relatively light spring providing for the actuation of said mechanism in the other direction only after the speed has been reduced to a point substantially below said given speed before said biased member is restored to operative position.

4. In combination, a torque converter comprising fluid-connected driving and driven members, means for mechanically connecting both of said members for rotation together in either direction, said means including relatively movable cooperating clutch parts connected, respectively, with said driving and driven members, means acting to prevent the engagement of said cooperating clutch parts, and means responsive to a reduction in speed of said driving member below the speed of said driven member for rendering said preventing means inoperative so as to provide for the engagement of said relatively movable clutch parts.

5. In combination, a torque converter comprising fluid-connected driving and driven members, means for mechanically connecting both of said members together, said means including cooperating clutch parts connected, respectively, with said driving and driven members, governor mechanism rotatable with said driven member and operative under the influence of centrifugal force for engaging said clutch parts, biased means operative to resist said governor mechanism until a given speed has been attained, and means operative upon a temporary reduction in speed of said driving member for permitting said governor mechanism to engage said clutch parts.

6. In combination, a pair of driving and driven members mounted for relative rotation, a pair of clutch parts carried, respectively, by said driving and driven members and adapted to be engaged to cause said members to rotate together, governor mechanism responsive to the speed of rotation of said driven member and adapted to urge said clutch parts toward engagement, a gate member interposed between said clutch parts and operative in one position to prevent their engagement, and means responsive to a deceleration of the driving member relative to the driven member for moving said gate member out of the way of said clutch parts.

7. In combination, a pair of driving and driven members mounted for relative rotation, a pair of clutch parts carried, respectively, by said driving and driven members and adapted to be engaged to cause said members to rotate together, means responsive to the speed of rotation of said driven member for urging said clutch parts toward engagement, a gate member interposed between said clutch parts and operative in one position to prevent their engagement, said gate member being carried by said driven member and capable of limited relative rotation, and means establishing frictional contact between the driving member and said gate member and operative upon a deceleration of the member relative to the driven member for moving said gate member out of the way of said clutch parts.

8. In combination, a driven member including a shaft and a turbine wheel mounted thereon, a driving member mounted coaxially with respect to said shaft and including a driving casing enclosing said turbine wheel and carrying a fluid impeller arranged to discharge fluid into said turbine wheel in a plane which is substantially tangential with respect to the circumference of said turbine wheel, the latter being arranged to discharge the fluid radially inwardly, a sleeve journaled on said shaft and extending to a point within said casing, a vaned stator carried adjacent the inner end of said sleeve and adapted to direct the fluid from the turbine wheel back into the impeller, and governor controlled clutch mechanism disposed within said driving casing and adapted to mechanically connect said driving casing and said driven turbine wheel together.

9. In combination, a torque converter comprising fluid-connected driving and driven members, a governor controlled mechanism adapted to mechanically connect said members for rotation at a one-to-one ratio after the driven member has attained a given speed, and means responsive to the occurrence of relative rotation between said members in a given direction for controlling the operation of said governor mechanism.

10. In combination, a torque converter comprising fluid-connected driving and driven members, a governor controlled mechanism adapted to mechanically connect said members for rotation at a one-to-one ratio after the driven member has attained a given speed, and means responsive to relative rotation between said members for positively preventing the governor mechanism from acting until relative rotation in a given direction occurs.

11. In combination, a torque converter comprising fluid-connected driving and driven members, a governor controlled mechanism adapted to mechanically connect said members for rotation at a one-to-one ratio after the driven member has attained a given speed and including an axially shiftable toothed member, and means responsive to the occurrence of relative rotation between said members and including a rotatable toothed member cooperating with said first toothed member for positively preventing the governor mechanism from acting until relative rotation in a given direction occurs.

12. In combination, a torque converter comprising fluid-connected driving and driven members, means for mechanically connecting both of said members together, means responsive to the speed of rotation of said driven member for establishing a direct mechanical connection between said driving and driven members, a shiftable part blocking the action of said speed responsive means so long as the speed of the driving member exceeds the speed of the driven member, and means for moving said shiftable part out of the way of said speed responsive means when the driven member begins to overrun the driving member.

13. In combination, a driven member including a shaft and a turbine wheel mounted thereon, a driving member mounted coaxially with respect to said shaft and including a driving casing adapted to be connected with a source of power and provided with a fluid impeller arranged to discharge fluid into said turbine wheel in a plane which is substantially tangential with respect to the circumference of said turbine wheel, the latter being arranged to discharge the fluid inwardly toward the impeller, a sleeve journaled on said shaft and extending to a point within said casing, a vaned stator carried adjacent the inner end of said sleeve and extending from the radially inner portions of said turbine wheel to the radially inner portions of said impeller to direct the fluid from the turbine wheel into the impeller, a clutch member spline on said driven shaft and engageable with portions of said casing to mechanically connect said driving casing and said driven turbine wheel together, and governor mechanism within said casing for shifting said clutch member.

14. In combination, a housing, a driven member including a shaft and a turbine wheel mounted thereon, a driving member mounted coaxially with respect to said shaft and including a driving casing disposed in said housing and embracing the turbine wheel and provided with a fluid impeller arranged to discharge fluid into said turbine wheel, a sleeve journaled on said shaft and extending to a point within said casing, a pair of bearing means for supporting said sleeve on said shaft, one being disposed in a position substantially between said fluid impeller and said turbine wheel and the other being disposed rearwardly of the driving casing which embraces the turbine wheel, a vaned stator carried adjacent the inner end of said sleeve and said one bearing means and extending from the radially inner portions of said turbine wheel to the radially inner portions of said impeller to direct the fluid from the turbine wheel into the impeller, bearing means supporting said shaft adjacent said other bearing means in the rear portion of said housing, and a one-way brake device disposed in a plane adjacent said two last mentioned bearing means in the rear portion of the housing and acting to anchor the sleeve to said portion of the housing to prevent rotation of the stator in one direction.

15. In combination, a housing, a driven member including a shaft and a turbine wheel mounted thereon, a driving member mounted coaxially with respect to said shaft and including a driving casing disposed in said housing and embracing the turbine wheel and provided with a fluid impeller arranged to discharge fluid into said turbine wheel, a sleeve journaled on said shaft and extending to a point within said casing, a pair of bearing means for supporting said sleeve on said shaft, one being disposed in a position substantially between said fluid impeller and said turbine wheel and the other being disposed rearwardly of the driving casing which embraces the turbine wheel, a vaned stator carried adjacent the inner end of said sleeve and said one bearing means and extending from the radially inner portions of said turbine wheel to the radially inner portions of said impeller to direct the fluid from the turbine wheel into the impeller, bearing means supporting said shaft adjacent said other bearing means in the rear portion of said housing, a one-way brake device disposed in a plane adjacent said two last mentioned bearing means in the rear portion of the housing and acting to anchor the sleeve to said portion of the housing to prevent rotation of the stator in one direction, and bearing means disposed between the driving casing and the stator sleeve, said last named bearing means being disposed in a plane adjacent said above mentioned one bearing means which is disposed substantially between the fluid impeller and the turbine wheel.

16. In a hydraulic transmission, a driven part, means for driving the latter including a hydraulic unit and a second part rotatable adjacent said driven part, means adapted to drive said driven part independently of said hydraulic unit, and means automatically responsive to the overrunning of said second part by said driven part after said second part has attained a predetermined speed for placing the hydraulic unit out of operation and to provide for the transmission of power to said driven part through said second mentioned means independently of the hydraulic unit.

17. In a hydraulic transmission, a driven part, means for driving the latter including a hydraulic unit and a second part rotatable adjacent said driven part, means adapted to drive said driven part independently of said hydraulic unit, a ring member carried by one of said parts for relative rotation and frictionally associated with the other part so as to be responsive to and to be rotated relative to said one part by the overrunning of said second part by said driven part for automatically placing the hydraulic unit out of operation and to provide for the transmission of power to said driven part through said second mentioned means independently of the hydraulic unit and only after the driven part has reached a speed of rotation where it can be handled by the driving means in a one-to-one drive.

18. In a hydraulic transmission, a driven member, a hydraulic unit for driving the driven member and including a part rotatable about the axis of said driven member and operatively connected to drive said driven member, means providing for rotating said driven member independently of the operation of said hydraulic unit and including a second member also rotatable coaxially of said driven member, and means automatically operative when one of said members begins to overrun the other in one direction after the overrunning member has attained a predetermined minimum speed for directly connecting said two members together to drive said driven member independently of said rotatable part.

19. In a hydraulic transmission, a driven member, a hydraulic unit for driving the driven member and including a part rotatable about the axis of said driven member and operatively connected to drive said driven member, means providing for rotating said driven member independently of the operation of said hydraulic unit and including a second member also rotatable coaxially of said driven member, and means deriving power from the rotation of said driven member and operative when one of said members begins to overrun the other in one direction for directly connecting said two members together to drive said driven member independently of said rotatable part.

20. In a hydraulic transmission, a hydraulic unit comprising a driving and a driven part provided with a hydraulic coupling therebetween, means adapted to mechanically connect said driving and driven parts so as to rotate together, and means automatically operative when said driven part starts to overrun said driving part above a predetermined speed of rotation of the driving part for controlling said connecting means.

21. In combination, a housing, a driven member including a shaft and a rotor mounted thereon, a driving member mounted coaxially with respect to said shaft and including a driving casing disposed in said housing and embracing the rotor and provided with a fluid impeller arranged to discharge fluid into said rotor, a vaned reaction member disposed between said fluid impeller and said rotor, a sleeve, a bearing support between said shaft and said sleeve substantially in the plane of said reaction member, one end of said sleeve being connected with said reaction member and the other end being connected with said housing, and means at one of said points of connection serving as a one-way brake device for anchoring the reaction member to said housing to prevent rotation thereof in one direction.

22. In a variable speed transmission, the combination, with a driving shaft, and a driven shaft, of a hydraulic torque converter having driving and driven turbine wheels which are connected respectively with the driving and driven shafts for producing a multiplication of torque therebetween, a clutch for connecting the driving and driven shafts together in a one-to-one drive, and means for automatically throwing in the clutch upon a momentary reduction in the speed of rotation of the driving shaft after the latter has acted through the torque converter to bring the driven shaft up to a speed where it can be handled by the driving shaft in a one-to-one drive.

23. In a variable speed transmission, the combination, with a driving shaft, and a driven shaft, of a hydraulic torque converter having driving and driven turbine wheels which are connected respectively with the driving and driven shafts for producing a multiplication of torque therebetween, a clutch for connecting the driving and driven shafts together in a one-to-one drive, means for automatically throwing in the clutch upon a momentary reduction in the speed of rotation of the driving shaft after the latter has acted through the torque converter to bring the driven shaft up to a speed where it can be handled by the driving shaft in a one-to-one drive, and means for automatically releasing the clutch when the speed of rotation of both shafts drops below a predetermined minimum.

24. In a variable speed transmission, the combination, with a driving shaft, and a driven shaft, of a hydraulic torque converter having driving and driven turbine wheels which are connected respectively with the driving and driven shafts for producing a drive therebetween, a clutch for connecting the driving and driven shafts together in a one-to-one drive, and means for automatically throwing in the clutch upon a momentary reduction in the speed of rotation of the driving shaft after the latter has acted through the torque converter to bring the driven shaft up to a speed where it can be handled by the driving shaft in a one-to-one drive.

25. In a variable speed transmission, the combination with a driving shaft, and a driven shaft, of a hydraulic torque converter including driving and driven turbine wheels and a reaction wheel which are associated respectively with the driving and driven shafts for producing a drive therebetween, a one-way overrunning brake mechanism on which the reaction wheel is mounted, a clutch for connecting the driving and driven shafts together in a one-to-one drive, means for automatically throwing in the clutch upon reduction in speed of the driving shaft when the driven shaft has reached a speed where it can be handled by the driving shaft in the one-to-one drive.

ROBERT LAPSLEY.